United States Patent Office 3,285,729
Patented Nov. 15, 1966

3,285,729
HERBICIDAL SOIL FUMIGATION
Edward D. Weil, Lewiston, N.Y., assignor to Hooker Chemical Corporation, Niagara Falls, N.Y., a corporation of New York
No Drawing. Filed Nov. 30, 1962, Ser. No. 241,166
8 Claims. (Cl. 71—2.3)

This invention relates to control of weeds by halogenated aromatic fumigants. More particularly, this invention describes dichloro-ortho-xylene and dichloro-ortho-xylyl chloride as useful herbicidal fumigants and relates to methods for their use in destroying the sub-surface plant organs such as dormant seeds, roots or rhizomes, tubers and the like.

While the chemical eradication of weeds and undesirable vegetation is very old and the number of herbicides suggested and used is extensive, surprisingly little progress has been made against those weeds having a substantial portion of the plant below the surface of the ground or water; also, little progress has been made in killing seeds before they germinate. The reasons for this are several. Among them is that fact that many weeds and undesirable plants have substantial portions of their parts below the surface of the soil or water as rhizomes, tubers, or roots and store a sizable reserve of food there. Thus, when a portion of the plant above the soil is killed, this sub-soil reserve enables the plant to rejuvenate readily. Weed seeds may remain viable in the soil for many years and may cause reinfestation thereof long after all the weeds are apparently killed.

Another problem is that many otherwise satisfactory herbicidal fumigants such as methyl bromide, ethylene oxide, and formaldehyde, for example, require a surface cover, such as a tarpaulin to be placed over a treated area, to be effective, which is inconvenient in the case of weeds growing in the soil and almost impossible in the case of aquatic weeds. Many fumigants and herbicides generally are rather quickly dissipated or leached out of the soil by moisture, making them ineffective against dormant seeds or aquatic weeds.

An additional disadvantage of most of the known effective herbicides is the high rate of application required to function effectively. This, of course, if a deterrent to the widespread use of these phytotoxic materials where the area to be treated is large and the resulting expense would be great, or where the economy of the region is substandard and cost is of paramount importance. For example, in many navigable streams, rivers and canals, aquatic weeds are capable of curtailing navigation, especially where climatic conditions are favorable for vigorous plant growth. In these areas, often in the tropics, the use of waterways is sometimes actually halted by this growth even causing substandard economic losses to the people inhabiting the area. In many of these areas, the economy is sub-standard, and even an effective herbicide, unless effective at low rates of application, cannot be used, the cost of the program being prohibitive under the circumstances.

The applicant has found that compounds of the structure:

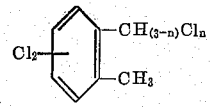

wherein $n$ is 0 or 1 (i.e., dichloro-o-xylene and dichloro-o-xylyl chloride) have a very high degree of herbicidal activity against sub-surface parts of weeds, seeds, etc. By contrast, the dichlorination products of meta- and para-xylene are substantially inactive, as are the lower and higher chlorinated xylenes. Instead of chlorine, a halogen such as bromine may be employed too, and the formula given may be modified by substituting therein X (for halogen) for Cl.

While low cost and effectiveness on sub-surface organs of weeds are prime attributes of the composition of this invention, there are additional ancillary advantages present in both the composition and its method of use. For example, the present composition and methods allow the use of both the crude and the highly purified product. Since cost is paramount, this effects a considerable saving where the crude reaction mixture can be used. An additional advantage of the compositions of this application is that because of their physical characteristics they may be useful as low-cost solvents for other pesticidal and biocidal materials, including herbicides, insecticides and fungicides.

This enables the user to obtain herbicidal effectiveness at solvent cost. Thus, the compositions may be used in combination with herbicides, such as halogenated phenylacetic acid, and their derivatives, the halogenated benzoic acids and their derivatives, hexachlorocyclopentadiene and its derivatives, and the like. The compositions may also be combined with insecticides such as the insecticidal carbamates, DDT, methoxychlor, benzene hexachloride, and chlordane and fungicides such as sulfur and the dithiocarbamates.

For the purpose of formulating the inventive compositions by themselves or with the other herbicides and/or pesticides, solid diluents such as talcs, clays, flours, starches, diatomaceous earth, mica, sawdust, alkaline earth limes, carbamates, and phosphates may be used or liquid diluents or carriers such as water, alcohols, ketones, esters, glycols, and petroleum fractions and the like may be employed.

Whether using liquid or solid formulations, it is frequently found to be advantageous to employ emulsifying, suspending, foaming, wetting, conditioning, and dispersing agents to impart certain desirable physical characteristics to the resulting formulation. These agents are herein referred to as being within the group of adjuvants suitable for use in the practice of the invention and are frequently used to facilitate handling and application. A satisfactory but incomplete list of such adjuvants is set forth in a list in "Soap and Chemical Specialties," vol. 31, No. 7, pages 50 to 61; No. 8, pages 48 to 61; No. 9, pages 52 to 67; and No. 10, pages 38 to 67 (1955), and in revisions thereof appearing subsequently in the same periodical. Other listings and sources of adjuvant materials are set forth in Bulletin E–607 of the Bureau of Entomology and Plant Quarantine of the United States Department of Agriculture.

Ddichloro-o-xylene occurs in several isomeric forms, i.e., the 3,4-, 4,5-, 3,6-, and 3,5-dichloro-substituted forms. Dichloro-o-xylyl chloride occurs as the 3,4-, 4,5-, 3,6-, 3,5-, 4,6-, and 5,6-dichloro-substituted forms. For commercial use, it is sometimes uneconomical to separate the isomers and accordingly in view of the fact that mixtures thereof have been found to be useful, mixtures are preferred for use in the present invention.

Such preferred herbicidal compounds, the dichloro-o-xylenes and dichloro-o-xylyl chlorides of this invention may be prepared by chlorinating o-xylene at temperatures ranging from about 0 degrees to about 100 degrees centigrade, in the presence of a chlorination catalyst of the Lewis acid type, e.g., ferric chloride, antimony chloride, stannic chloride, iodine, etc., until substantially two moles of hydrogen chloride have been evolved per mole of starting material. A reaction product containing the herbicidally active dichlorinated-o-xylene, primarily the 3,4,- 4,5-, and 3,6-dichloro-isomers is produced. If desired, this reaction product may be used for herbicidal purposes or may be purified by fractional distillation to remove lower and higher chlorination products. Where fractionation is intended, it is advantageous to chlorinate the starting material, o-xylene to 1.4 to 1.9 chlorine atoms per mole, and then fractionally to distill to remove, as a foreshot, the herbicidally inactive monochloro-o-xylene which can be recycled into the next batch of starting material.

If dichloro-o-xylyl chloride is to be prepared, the dichloro-o-xylene is further chlorinated on the side chain by eliminating the Lewis acid catalyst and chlorinating at elevated temperatures, above about 70 degrees centigrade, preferably in the presence of a source of actinic light such as a mercury vapor lamp, until about one mole of hydrogen chloride per mole of dichloro-o-xylene has been evolved. If desired, a mixture of dichloro-o-xylene and dichloro-o-xylyl chloride may be prepared by introducing less chlorine into the side chain during chlorination.

While the rate of application of the herbicides and the methods of application thereof is largely dependent upon soil structure, the type of weed populations, climate, and thoroughness of control required, under average conditions the following are preferred. The desired compositions are preferably applied to the soil, preferably by admixing to the depth to which the bulk of the weed seeds, roots, rhizomes, and tubers, etc., extend. This generally is from a fraction of an inch to 12 inches below the soil surface, and such admixing may be conveniently done by raking, disking, chewing, or plowing the composition to the desired depth. A rate of about 3 pounds to about 400 pounds per acre represents the usual rate of application of the compositions of this invention; 10 to 200 pounds per acre represents a more preferred rate.

To illustrate better the workings of this invention, including the preparation of formulations and methods of application, the following examples are given; none of these examples is to be construed to limit the present invention. All parts in the specification and claims are by weight and all temperatures are in degrees centigrade unless otherwise indicated.

*Example 1.—Emulsifiable formulation of dichloro-ortho-xylene*

The following ingredients were blended:

| | Parts |
|---|---|
| Dichloro-o-xylene | 95 |
| Emulsifier blend consisting of alkylphenolpolyoxy ethylene ether in sodium alkyl naphthalene sulfonate | 5 |

The resultant solution was emulsified with water before use as a herbicide.

*Example 2.—Granular formulation of dichloro-o-xylyl chloride*

Dichloro-o-xylyl chloride was sprayed onto a tumbling mass of 30–60 mesh attapulgus clay, using equal parts by weight of clay and toxicant. There resulted a dry appearing, free flowing granule. This was applied to the soil by the use of a fertilizer spreader prior to disking into the soil to the desired depth.

*Example 3.—Herbicidal evaluation of dichloro-o-xylene, dichloro-o-xylyl chloride, and related isomers*

In the fall, a large area having a heavy natural infestation of perennial and annual weeds especially nut grass, quack grass, wild carrot, mustard, plantain, dandelion, witch grass, dock, ragweed, and timothy was divided into plots, sprayed at rates of 20, 50, 100 and 200 pounds per acre using various chloro-aromatic chemicals. Immediately after spraying, the chemicals were tilled into the soil to a six-inch depth. Contiguous plots, left untreated for control purposes, were similarly tilled. In the next spring, observations of weed growth were made and the percent control of weeds (relative to the untreated plots) was carefully checked with the following results:

| Chemical | Lbs./Acre | Result |
|---|---|---|
| Dichloro-o-xylene | 200 | 100% control all species. |
| Do | 100 | 100% control quackgrass, timothy, witchgrass, dock, plantain, ragweed, dandelion, mustard; 50% control nutgrass. |
| Do | 50 | 100% control quackgrass, timothy, witchgrass, dock, plantain, ragweed, dandelion, mustard; 10% control nutgrass. |
| Do | 20 | 100% control ragweed, other species not controlled. |
| Dichloro-p-xylene | 200 | 0. |
| Dichloro-m-xylene | 200 | 0-5% control annuals only. |
| Monochloroxylyl Chloride | 200 | 0. |
| 1,2,3,4-tetrachlorobenzene | 200 | 0. |

*Example 4.—Herbicidal evaluation (continued)*

Soil infested with seeds of ragweed, pigweed, and lambsquarters was sprayed in early spring (before germination) with various chloroaromatic chemicals, which were then raked into the soil to a 1–2″ depth. In the following summer, when the above-named weeds were populous in adjacent untreated plots, the following percentages of weed control were noted in the treated plots:

| Chemical | Lbs./acre | Percent Control | | |
|---|---|---|---|---|
| | | Ragweed | Pigweed | Lamb's-quarters |
| Dichloro-o-xylyl Chloride | 5 | 40 | 30 | 30 |
| Do | 10 | 80 | 70 | 70 |
| Do | 20 | 95 | 95 | 90 |
| Benzyl Chloride | 20 | 0 | 0 | 0 |
| Dichloro-p-xylyl Chloride | 20 | 0 | 0 | 0 |
| Tetrachloro-m-xylyl chloride | 20 | 0-5 | 0-5 | 0-5 |
| Tetrachloro-o-xylyl chloride | 20 | 0 | 0 | 0-5 |
| Monochloro-o-xylyl Chloride | 20 | 0 | 0 | 0 |
| Xylene (technical mixture) | 20 | 0 | 0 | 0 |
| p-Xylylene Hexachloride | 20 | 0 | 0 | 0 |

In the examples, chlorinated compounds within the invention are given, as they are preferred embodiments thereof. Similar experiments with suitable corresponding halogen compounds such as bromine derivatives will also give useful herbicidal activity.

Having described the invention and given its many advantages, what is claimed is:

1. A method for the control of sub-surface vegetation which comprises applying a phytotoxic amount of a halogenated aromatic compound of the formula:

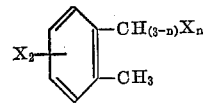

where X is a halogen selected from the group consisting of chlorine and bromine and $n$ is zero to 1, to the sub-surface locus to be treated.

2. A method for the control of sub-surface vegetation which comprises applying a phytotoxic amount of a chlorinated aromatic compound of the formula:

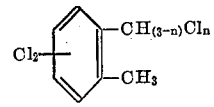

where $n$ is zero to 1, to the sub-surface locus to be treated.

3. The method of claim 2 wherein the chlorinated aromatic compound applied is dichloro-ortho-xylene.

4. The method of claim 2 wherein the chlorinated aromatic compound is dichloro-ortho-xylyl chloride.

5. The method of claim 1 in which the herbicide is applied at a rate of from about five to about 400 pounds per acre.

6. The method of claim 2 in which the herbicide is applied at a rate of from about 5 to about 400 pounds per acre.

7. The method of claim 1 in which the herbicide is applied at a rate of from about 10 to about 200 pounds per acre.

8. The method of claim 2 in which the herbicide is applied at a rate of from about 10 to about 200 pounds per acre.

References Cited by the Examiner

UNITED STATES PATENTS

| | | | |
|---|---|---|---|
| 2,965,682 | 12/1960 | Horvath | 71—2.3 X |
| 3,032,596 | 5/1962 | Lindemann | 71—2.3 X |
| 3,068,298 | 12/1962 | Huffman | 71—2.6 X |

LEWIS GOTTS, *Primary Examiner.*

JULIAN S. LEVITT, *Examiner.*

J. O. THOMAS, A. J. ADAMCIK, *Assistant Examiners.*